July 13, 1954
C. W. RAINEY
2,683,578
HIGH-TENSION WIRING HARNESS
Filed Aug. 24, 1950
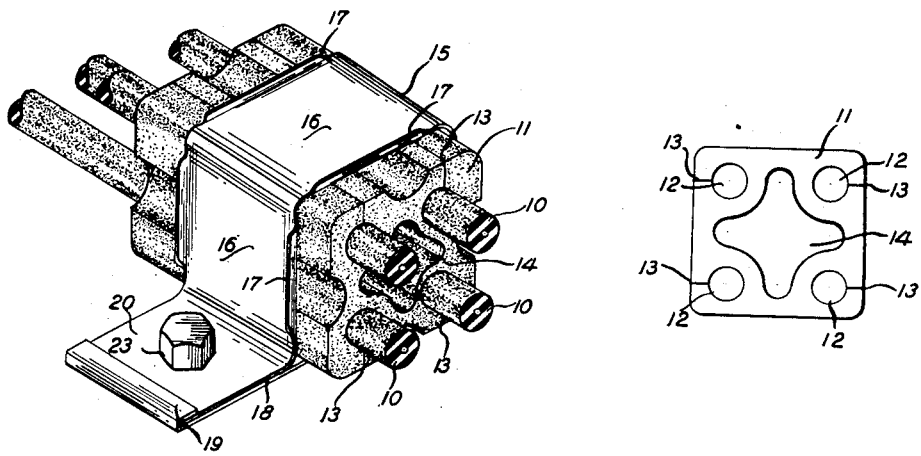
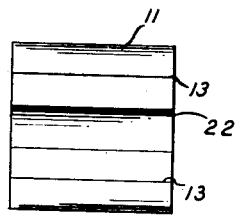
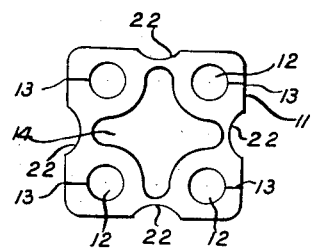
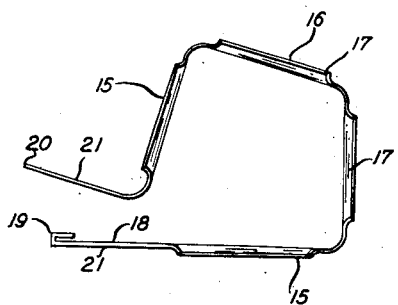
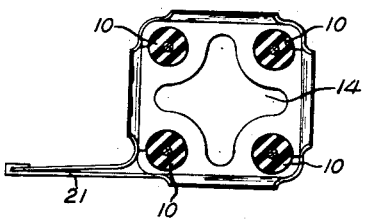
C. W. RAINEY
INVENTOR.
BY
ATTORNEYS Patented July 13, 1954

2,683,578

UNITED STATES PATENT OFFICE 2,683,578

HIGH-TENSION WIRING HARNESS

Challenor W. Rainey, Dearborn, Mich., assignor to Ford Motor Company, Dearborn, Mich., a corporation of Delaware Application August 24, 1950, Serial No. 181,274

1 Claim. (Cl. 248—68)

This invention is directed to the electrical system of motor vehicles and more particularly with a harness for mounting high tension ignition conductors. The high tension ignition leads on internal combustion engines have long been a prolific source of maintenance due to the fact that they must operate at voltages in the neighborhood of fifteen thousand under the most adverse circumstances for the preservation of insulating materials. The very nature of the service requires that these conductors be exposed to a combination of heat, lubricants, water and vibration. These factors result in an early breakdown in the high tension cable insulation with concomitant leakage of the ignition current to ground. The instant invention is designed to support these high tension cables in a manner that will minimize the troubles recited above without adding substantially to the cost of the harness or the time required for assembly.

This invention is probably best understood by a study of the drawings in which

Figure 1 is a perspective view of the harness as applied to a motor vehicle.

Figure 2 is a plan view of an insulating grommet.

Figure 3 is an elevation view of the same insulating grommet.

Figure 4 is a plan view of another form of insulating grommet.

Figure 5 is an elevation of the bracket in the open position.

Figure 6 is a plan of the bracket with the grommet and cables applied and ready for shipment.

In Figure 1 the four high tension conductors 10 are shown in place in openings 12 (Fig. 2) provided in grommet 11. Openings 12 are provided with longitudinal slits 13 to enable the wires to be placed in opening 12 without the necessity of threading the wire through for a substantial portion of its length. Grommet 11 is preferably an extruded elastomer member and is provided with central aperture 14 to aid in the curing of the elastomer and to economize in material and weight.

Grommet 11 and conductors 10 are supported in bracket 15 which is fabricated in the form of a quadrilateral from sheet metal. Each of the four sides 16 of this quadrilateral have upturned edges 17 to stiffen the assembly. One of sides 16 is extended beyond the limits of the quadrilateral to form extension 18 which terminates in recurved portion 19. The adjacent side 16 at one end is bent at right angles to provide ear 20. In the assembled position, extension 18 and ear 20 are coextensive in area and parallel. Ear 20 and extension 18 are perforated to provide mounting holes 21 which in the assembled position are coaxial.

Figure 2 is a plan view of one form of the grommet and clearly illustrates the details of the member mentioned above. Figure 3 is an elevation view of the same grommet and shows the longitudinal slits 13 which connect openings 12 with the exterior of the grommet and permit the wires to be directly inserted into the openings 12.

Figure 4 is a plan view of another form of grommet 11. In this form the surfaces of grommet 11 which are parallel to openings 12 are provided with recesses 22 to facilitate compression of grommet 11 in the assembly operations.

Figure 5 is an elevation view of bracket 15 as received and ready for assembly with conductors 10 and grommet 11. Figure 6 is an elevation of the bracket 15, grommet 11 and conductors 10 assembled as a unit and ready for application to the internal combustion engine. In preparing this assembly, the operator spreads openings 12 along slits 13 and inserts conductors 10 into these openings. After a conductor 10 has been applied to each of the openings 12, bracket 15 is placed in position surrounding grommet 11 and sufficient pressure is applied to the two sides of grommet 11 which are perpendicular to ear 20 and extension 18 to permit the extremity of ear 20 to be inserted into the recurved portion 19 of extension 18. The size of grommet 11 is chosen with relation to that of bracket 15 so that with the assembly in the position shown in Figure 6, grommet 11 and hence conductors 10 will be slightly in compression. In this position, attention is invited to the fact that ear 20 and extension 18 are not quite parallel but make an acute angle with each other.

In the position shown in Figure 6, grommet 11 is under sufficient compression to insure a stable assembly for shipment. However, this compression is insufficient to prevent manual adjustment of conductors axially in openings 12 in the final application of the assembly to the internal combustion engine.

In applying this assembly to the internal combustion engine the conductors 10 are first adjusted axially to the correct position and then bolt 23 is thrust through coaxial holes 21 provided in both extension 18 and ear 20.

Bolt 23 is threaded into a suitable threaded opening on the internal combustion engine (not shown) and tightened until extension 18 and ear 20 are adjacent and parallel. This tightening further compresses grommet 11 and conductors 10 to an extent which precludes any further movement of the grommet in the bracket or the conductors in the grommet. To accomplish this it is of course necessary that the free dimensions of grommet 11 be sufficiently smaller than the corresponding dimensions of bracket 15 when ear 20 and extension 18 are forced together, to supply the necessary compression.

I claim as my invention:

A high tension wiring harness comprising a bracket and high tension wires supported by said bracket, said bracket comprising a sheet metal member formed to define a rectangular opening, and terminating respectively in an extension and an ear approximately parallel to said extension, said extension terminating in a recurved portion adapted to receive the end of said ear, and a conductor supporting elastomer member which in cross section in its uncompressed state is rectangular and geometrically similar in shape to the rectangular opening defined by said bracket and is provided with a longitudinal hole at each corner for the reception of said wires, slits through said elastomer member connecting each of said holes to the exterior of the elastomer member and a high tension wire secured in each of said holes, the sizes of said bracket, elastomer member and wires being chosen so that the elastomer member and the contained wires are slightly compressed when the ear is received in the recurved portion of the extension and the ear and the extension together defining an acute angle whereby the wires are secured against accidental axial movement in the elastomer member but are capable of deliberate manual adjustment and so that when the ear and extension are brought into parallel relationship the elastomer member is strongly compressed whereby no relative movement of the wires and bracket is possible.

References Cited in the file of this patent

UNITED STATES PATENTS

| Number | Name | Date |
|---|---|---|
| 1,078,201 | Hoybook | Nov. 11, 1913 |
| 2,342,958 | Morehouse | Feb. 29, 1944 |
| 2,351,790 | Tinnerman | June 20, 1944 |
| 2,397,279 | Le Vesconte | Mar. 26, 1946 |
| 2,431,379 | Ellinwood | Nov. 25, 1947 |
| 2,470,814 | Hain | May 24, 1949 |

FOREIGN PATENTS

| Number | Country | Date |
|---|---|---|
| 24,441 | Great Britain | Nov. 18, 1915 |